(12) United States Patent
Terakawa et al.

(10) Patent No.: US 8,874,295 B2
(45) Date of Patent: Oct. 28, 2014

(54) CONTROL APPARATUS OF HYBRID VEHICLE

(71) Applicants: Aisin Seiki Kabushiki Kaisha, Kariya (JP); Aisin Ai Co., Ltd., Nishi (JP)

(72) Inventors: Tomomitsu Terakawa, Anjo (JP); Yasuhiro Hosoi, Chiryu (JP); Yuichiro Kitamura, Nagoya (JP); Yoshihide Suzuki, Toyoake (JP); Katsunori Ueda, Okazaki (JP); Tuyoshi Murakami, Handa (JP); Yoshiyuki Aoyama, Nishio (JP); Kazutaka Kobayashi, Okazaki (JP); Takeshige Miyazaki, Chiryu (JP)

(73) Assignees: Aisin Seiki Kabushiki Kaisha, Kariya-Shi, Aichi-Ken (JP); Aisin Ai Co., Ltd., Nishio-Shi, Aichi (JP)

( * ) Notice: Subject to any disclaimer, the term of this patent is extended or adjusted under 35 U.S.C. 154(b) by 92 days.

(21) Appl. No.: 13/628,504

(22) Filed: Sep. 27, 2012

(65) Prior Publication Data

US 2013/0079966 A1    Mar. 28, 2013

(30) Foreign Application Priority Data

Sep. 27, 2011   (JP) ................. 2011-211133

(51) Int. Cl.
| | |
|---|---|
| *B60L 9/00* | (2006.01) |
| *B60W 10/08* | (2006.01) |
| *B60W 10/11* | (2012.01) |
| *B60W 20/00* | (2006.01) |
| *B60W 10/02* | (2006.01) |
| *B60W 30/19* | (2012.01) |
| *B60W 10/06* | (2006.01) |

(52) U.S. Cl.
CPC ............... *B60W 20/00* (2013.01); *B60W 10/08* (2013.01); *B60W 2510/244* (2013.01); *Y02T 10/6286* (2013.01); *B60Y 2400/71* (2013.01); *B60W 10/11* (2013.01); *B60W 10/02* (2013.01); *B60W 30/19* (2013.01); *B60W 10/06* (2013.01); *Y10S 903/93* (2013.01)

USPC ............... 701/22; 180/65.265; 903/930

(58) Field of Classification Search
CPC ... B60W 20/00; B60W 10/08; Y02T 10/6286
USPC ............... 701/22; 180/65.265; 903/930
See application file for complete search history.

(56) References Cited

U.S. PATENT DOCUMENTS 5,060,538 A * 10/1991 Schnell et al. ............. 74/473.28
6,397,698 B1 * 6/2002 Kamiya et al. ............. 74/473.11

(Continued)

FOREIGN PATENT DOCUMENTS

| JP | 10-28302 A | 1/1998 |
|---|---|---|
| JP | H1028302 A * | 1/1998 |

(Continued)

*Primary Examiner* — Helal A Algahaim
*Assistant Examiner* — Shardul Patel
(74) *Attorney, Agent, or Firm* — Buchanan Ingersoll & Rooney PC (57) ABSTRACT

A control apparatus of a hybrid vehicle includes an automatic transmission, a clutch, a motor, a battery, a driving assist control device performing a driving assist control by driving the motor to generate an assist torque, a gear shift assist control device performing a gear shift assist control by driving the motor in response to a decrease of the engine torque caused by the disengagement state of the clutch, an SOC value detection device detecting an SOC value, and a first mode switch device switching an operation mode of the hybrid vehicle from a normal mode in which the driving assist control and the gear shift assist control are performed to a battery power preserving mode in which the driving assist control is prohibited and the gear shift assist control is permitted in a case where the SOC value is equal to or smaller than a first predetermined value.

12 Claims, 6 Drawing Sheets

(56) References Cited

U.S. PATENT DOCUMENTS

| | | | |
|---|---|---|---|
| 8,310,198 B2 * | 11/2012 | Kurimoto et al. | 320/104 |
| 2005/0038576 A1 * | 2/2005 | Hara et al. | 701/22 |
| 2008/0017427 A1 * | 1/2008 | Nakanowatari | 180/65.2 |
| 2010/0125019 A1 * | 5/2010 | Tabata et al. | 477/3 |
| 2011/0307134 A1 * | 12/2011 | Yoshimi | 701/22 |
| 2012/0208672 A1 * | 8/2012 | Sujan et al. | 477/5 |
| 2012/0245781 A1 * | 9/2012 | Kanamori et al. | 701/22 |

FOREIGN PATENT DOCUMENTS

| | | |
|---|---|---|
| JP | 2004-176894 A | 6/2004 |
| JP | 2010-037776 A | 2/2010 |

* cited by examiner

○ Performed    X Not performed

| SOC | Temperature | Driving assist | Gear shift assist | Feeling deterioration inhibition |
|---|---|---|---|---|
| Large | High | ○ | ○ | X |
|  | Extremely low | X | X | ○ |
| Intermediate | High | X | ○ | X |
|  | Extremely low | X | X | ○ |
| Small | High | X | X | ○ |
|  | Extremely low | X | X | ○ |

CONTROL APPARATUS OF HYBRID VEHICLE

CROSS REFERENCE TO RELATED APPLICATIONS

This application is based on and claims priority under 35 U.S.C. §119 to Japanese Patent Application 2011-211133, filed on Sep. 27, 2011, the entire content of which is incorporated herein by reference.

TECHNICAL FIELD

This disclosure generally relates to a control apparatus of a hybrid vehicle.

BACKGROUND DISCUSSION

A hybrid vehicle including an engine that is operated by a combustion energy of fuel and an electric motor that is operated by an electric energy has been variously developed. The engine and the electric motor serve as power sources in a driving state of the hybrid vehicle. The hybrid vehicle has lately attracted the attention because noise and air contamination, for example, are avoidable by the electric motor mainly serving as the power source in a normal driving state of the hybrid vehicle. In addition, disadvantages of an electric vehicle, specifically, difficulties In a sudden acceleration, a high-load driving, and a high-speed driving caused by an insufficient mileage by one charge of battery or less torque generation, for example, may be eliminated by a combination use of the engine operated by the combustion energy.

According to the aforementioned hybrid vehicle, in order to selectively use the engine and the electric motor depending on a driving state of the hybrid vehicle, the hybrid vehicle includes plural driving modes in which each of the engine and the motor operates differently. Specifically, the plural driving modes include an engine driving mode in which the hybrid vehicle is driven only by the engine as the power source, a motor driving mode in which the hybrid vehicle is driven only by the electric motor as the power source, and an engine and motor driving mode in which the hybrid vehicle is driven by both the engine and the electric motor as the power sources, for example. The driving mode of the hybrid vehicle is automatically switchable depending on a mode switch condition that is specified beforehand, i.e., a power source map, for example, where the driving state of the hybrid vehicle including a vehicle speed and an accelerator operation amount serves as a parameter.

According to the aforementioned hybrid vehicle, however, in a case where either the combustion energy or the electric energy disappears, one of the power sources using the energy that disappears is inhibited from operating. Thus, even when the other of the power sources is operative, the driving performance of the hybrid vehicle may be deteriorated.

Therefore, a hybrid vehicle disclosed in JP10-28302A (which will be hereinafter referred to as Reference 1) includes a residue determining means for determining whether or not a total energy residue of an engine and an electric motor or an energy residue of the engine is equal to or smaller than a threshold value, and a mode switching means for switching each of the operating conditions of the engine and the electric motor to a mileage increase mode in which a mileage of the hybrid vehicle increases.

In addition, an automated manual transmission (which will be hereinafter referred to as an AMT) obtained by attaching an actuator to a known manual transmission is known to automatically perform a gear shift operation including an engagement/disengagement of a clutch and a gear shifting based on an intention of a vehicle driver or a vehicle state. According to the ATM, in a state where the clutch is in a disengagement state during the gear shifting, a torque from the engine (an engine torque) is not transmitted to wheels. Thus, even in a case where the vehicle driver desires or requires accelerating the vehicle, the acceleration of the vehicle is zero, which leads to a loss of acceleration feeling (a torque drop).

Therefore, according to the hybrid vehicle including the engine and the electric motor as the power sources, a gear shift assist is performed so as to apply a driving torque of the electric motor to the wheels as an assist in the disengagement state of the clutch. Then, the loss of acceleration feeling, for example, is avoidable.

Further, in a case where a request torque is equal to or greater than the engine torque that may be output during the driving state of the vehicle or even the request torque is smaller than the engine torque that may be output during the driving state of the vehicle, a driving assist where the driving torque from the electric motor is applied to the wheels as the assist of the engine torque is conducted for the purpose of energy saving.

According to the hybrid vehicle disclosed in Reference 1, when the energy residue is equal to or smaller than the threshold value, each of the operating conditions of the engine and the electric motor is brought into the mileage increase mode In which the mileage of the vehicle increases. The driving assist and the gear shift assist are still continuously performed.

In addition, according to the hybrid vehicle including the AMT, the gear shift assist where the driving torque of the electric motor is applied to the wheels in the disengagement state of the clutch during the gear shifting is impossible in a case where the energy residue of the electric motor (i.e., an SOC value of the battery) is reduced. Thus, a gear shift feeling may be drastically deteriorated (a loss of acceleration feeling or a gear shift shock, for example).

A need thus exists for a control apparatus of a hybrid vehicle which is not susceptible to the drawback mentioned above.

SUMMARY

According to an aspect of this disclosure, a control apparatus of a hybrid vehicle includes an automatic transmission including an input shaft driven to rotate by an engine torque of an engine mounted at a hybrid vehicle, an output shaft rotatably connected to driving wheels, and a plurality of gear sets configured to connect the input shaft and the output shaft to be rotatable at different gear ratios, the automatic transmission including a changing device (34, 36) that selects one of the plurality of gear sets to cause the selected one of the plurality of gear sets to be rotatably connected to the input shaft and the output shaft, a gear shift operation control device controlling a gear shift operation of the automatic transmission, a clutch being switchable by a clutch driving device between an engagement state where an output shaft of the engine and the input shaft of the automatic transmission are rotatably connected to each other and a disengagement state where the connection between the output shaft of the engine and the input shaft of the automatic transmission is released, a motor rotatably connected to the driving wheels, a battery connected to the motor, a driving assist control device performing a driving assist control by driving the motor as necessary in a driving state of the hybrid vehicle to generate an assist torque, a gear shift assist control device performing a gear shift assist control by driving the motor to generate the assist torque in response to a decrease of the engine torque transmitted to the driving wheels caused by the disengagement state of the clutch in a state where a gear shift condition is satisfied, an SOC value detection device detecting an SOC value of the battery, and a first mode switch device switching an operation mode of the hybrid vehicle from a normal mode in which the driving assist control and the gear shift assist control are performed to a battery power preserving mode in which the driving assist control is prohibited and the gear shift assist control is permitted in a case where the SOC value detected by the SOC value detection device is equal to or smaller than a first predetermined value.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
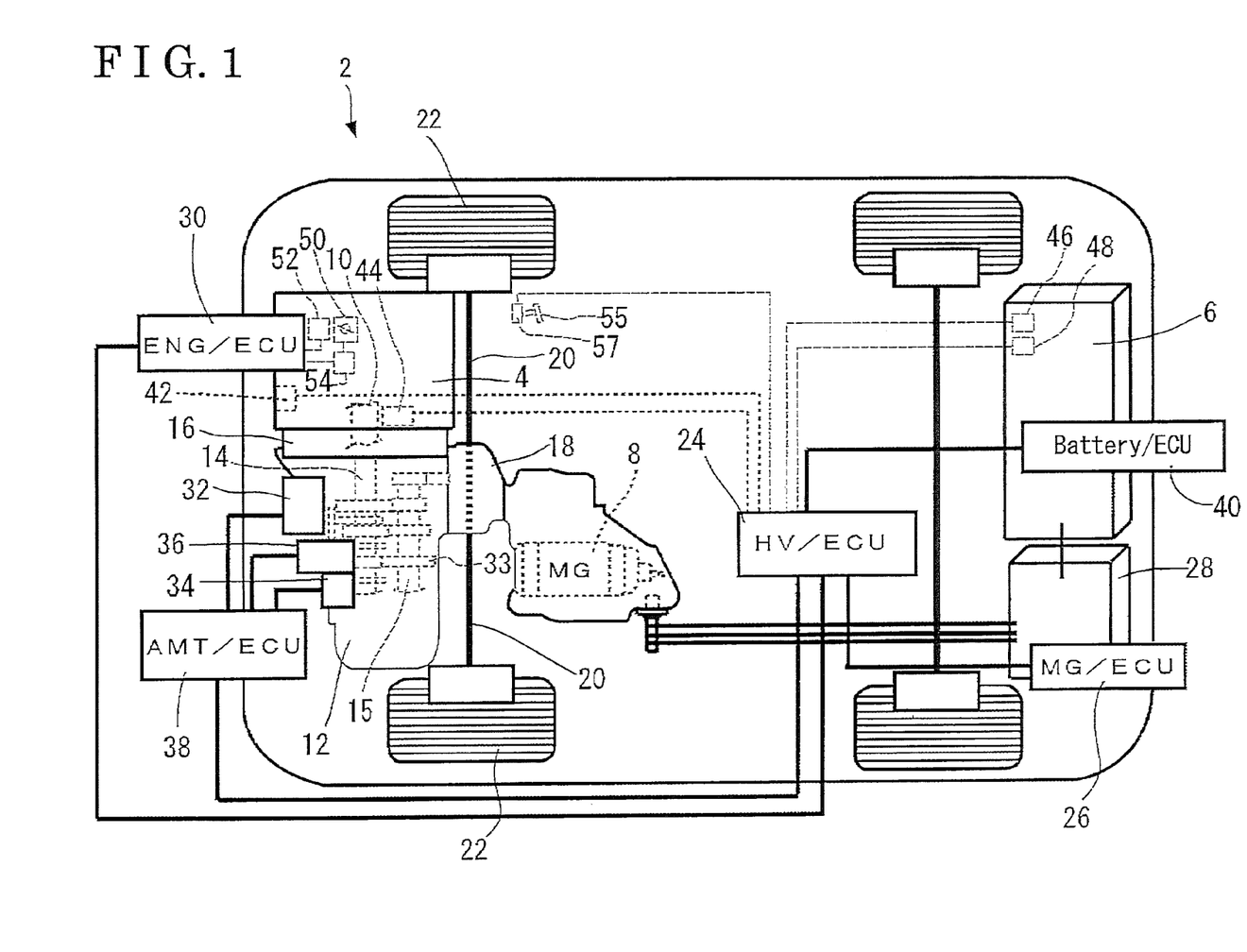
FIG. 1 is a schematic view of a hybrid vehicle using a control apparatus according to an embodiment disclosed here.

An embodiment will be explained with reference to the attached drawings. As Illustrated in FIG. 1, a hybrid vehicle 2 (which will be hereinafter simply referred to as a vehicle 2) includes two power generating machines, i.e., en engine 4 and a motor 8 which is driven by an electric power stored in a battery 6. The engine 4 and the motor 8 that are arranged in parallel with each other drive wheels of the vehicle 2. The motor 8 is also used as a generator (a motor generator MG).

An automated manual transmission (AMT) 12 serving as an automatic transmission is connected to the engine 4 via a clutch device 16 serving as a clutch. Specifically, the clutch device 16 is provided between an input shaft 14 of the automated manual transmission 12 and an output shaft 10 of the engine 4. The clutch device 16 engages and disengages between the output shaft 10 of the engine 4 and the input shaft 14 of the automated manual transmission 12 so as to control a transmission of an engine torque Te to the automated manual transmission 12. The vehicle 2 also includes a differential 18, a drive shaft 20, and driving wheels 22.

The vehicle 2 further includes a HV ECU (a hybrid vehicle electronic control unit) 24, a MG ECU (a motor generator electronic control unit) 26, an inverter 28, an ENG ECU (an engine electronic control unit) 30, an AMT ECU (an automated manual transmission electronic control unit) 38, and a battery ECU (a battery electronic control unit) 40. The HV ECU 24 entirely controls the vehicle 2. The MG ECU 26 sends a command to the motor 8 to be driven or regenerated. The inverter 28 converts a direct current of the battery 6 into an alternating current that is supplied to the motor 8. The ENG ECU 30 controls the engine 4 to stop or burn fuel. The AMT ECU 38 serves as a gear shift operation control device connected to a clutch actuator 32 serving as a clutch driving device, a shift actuator 34, and a select actuator 36 all of which are incorporated in the automated manual transmission 12 so as to perform an optimum gear shift operation by controlling the clutch actuator 32, the shift actuator 34, and the select actuator 36. The battery ECU 40 controls a charging condition of the battery 6 connected to the inverter 28. The shift actuator 34 and the select actuator 36 constitute a changing device.

The MG ECU 26, the ENG ECU 30, the AMT ECU 38, and the battery ECU 40 are controlled by the HV ECU 24.

Each of the HV ECU 24, the MG ECU 26, the ENG ECU 30, the AMT ECU 38, and the battery ECU 40 includes a control portion constituted by, for example, a CPU performing a calculation, a ROM, a RAM, and an EEPROM which stores data without a backup power source. The control portion performs a calculation process based on various control programs and maps stored in the ROM by the CPU. The. ROM stores the various control programs and the maps referred to when the aforementioned control programs are executed. The RAM temporarily stores a calculation result of the control portion and data input from the outside, for example. The EEPROM includes a nonvolatile memory for storing data.

The CPU, the ROM, the RAM, and the EEPROM of the control portion are connected to one another via a bus and connected to an input interface and an output interface.

Various sensors including an engine speed sensor 44, a battery temperature sensor 46 serving as a battery temperature detection device, and an SOC value detection sensor 48 serving as an SOC value detection device are connected to the HV ECU 24 via the MG ECU 26, the ENG ECU 30, the AMT ECU 38, and the battery ECU 40.

The engine 4 includes a throttle valve 50 adjusting an intake air volume to control an output of the engine 4, a throttle sensor 52 detecting an opening of the throttle valve 50 (a throttle opening), and a throttle actuator 54 opening and closing the throttle valve 50. The throttle sensor 52 and the throttle actuator 54 are connected to the ENG ECU 30. The ENG ECU 30 drives a starter 42 to start the engine 4.

The engine speed sensor 44 is provided in the vicinity of the output shaft 10 of the engine 4 so as to detect revolutions of the output shaft 10. An accelerator opening sensor 57 is provided at an accelerator pedal 55 so as to detect a depression amount of the accelerator pedal 55. A driving torque desired for the driving wheels 22 is determined on a basis of an accelerator opening detected by the accelerator opening sensor 57. In a case where a driver of the vehicle 2 depresses the accelerator pedal 55, an accelerator opening signal is transmitted from the accelerator opening sensor 57 to the HV ECU 24. In an operating state of the engine 4, the HV ECU 24 then transmits a command value as the driving torque to the ENG ECU 30 depending on the value of the accelerator opening signal transmitted to the HV ECU 24. The ENG ECU 30 operates the throttle actuator 54 based on the command value so as to open and close the throttle valve 50. The ENG ECU 30 controls the output and engine revolutions (an engine speed) Ne of the engine 4 while the engine speed sensor 44 is monitoring the revolutions of the output shaft 10. The engine revolutions Ne are also controllable by an operation of the throttle actuator 54 based on a request from the HV ECU 24, regardless of the depression amount of the accelerator pedal 55

The HV ECU 24 sends a command to the ENG ECU 30 to generate a driver request torque Tdrv, which is obtained by a conversion of the driving torque desired for the driving wheels 22 into the engine torque Te,. The magnitude of the driving torque varies depending on a gear ratio between the input shaft 14 and an output shaft 15 of the automated manual transmission 12, for example. Therefore, the conversion of the driving torque is performed on a basis of the output shaft 10 of the engine 4 serving as a reference point and then the driver request torque Tdrv is instructed to the ENG ECU 30. Hereinafter, a power generation torque driving the motor 8 and an assist torque generated by the motor 8 will be explained as values obtained on a basis of the aforementioned reference point.

Figure 3:
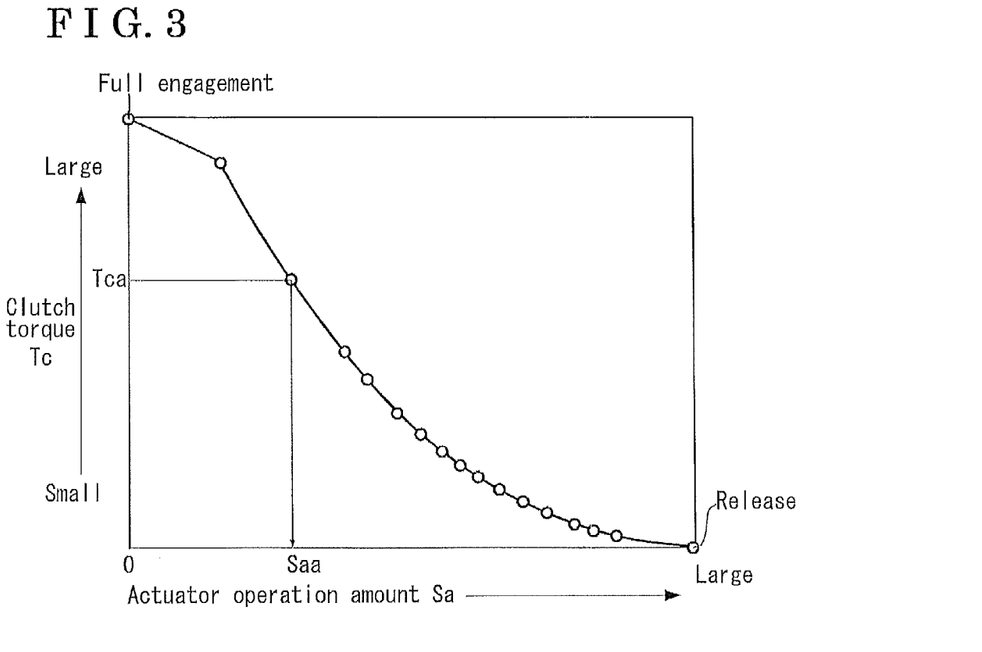
FIG. 3 Is a map Illustrating a relationship between a clutch torque and an actuator operation amount according to the embodiment.

The clutch device 16 includes, for example, a flywheel fixed to the output shaft 10 of the engine 4, a clutch disc spline-connected to the input shaft 14 of the automated manual transmission 12 so as to integrally rotate therewith, and a clutch assembly fixed to the flywheel. In the clutch device 16, a press-contact load of the clutch disc relative to the fly wheel is changed to thereby increase and decrease a rotation transmission amount between the flywheel and the clutch disc. A clutch torque Tc of the clutch device 16 is controllable to a target clutch torque requested by the HV ECU 24 depending on a driving state of the vehicle 2. The target clutch torque is achieved by the AMT ECU 38 that is controlled by a command from the HV ECU 24 to control an operation amount of the clutch actuator 32 operating the clutch device 16 based on a map illustrating a relationship between the clutch torque Tc and an actuator operation amount Sa illustrated in FIG. 3. The clutch actuator 32 constitutes a clutch driving device.

The automated manual transmission 12 is obtained by a known manual transmission to which the clutch device 16 that is controlled between an engagement state and a disengagement state by the operation of the clutch actuator 32, for example, is attached to thereby achieve an automatic gear shift operation. The automated manual transmission 12, which is a parallel gear transmission with five forward gears and one reverse gear, for example, includes plural gear sets 33 in addition to the input shaft 14 and the output shaft 15. In addition, the automated manual transmission 12 includes the shift actuator 34 and the select actuator 36 serving as the changing device for selectively meshing or connecting one of the plural gear sets 33. A method for driving the shift actuator 34 and the select actuator 36 is known (for example, refer to JP2004-176894A) and thus a detailed explanation thereof will be omitted.

The input shaft 14 of the automated manual transmission 12 is connected to the output shaft 10 of the engine 4 via the clutch device 16 so as to be engageable and disengageable relative to the output shaft 10, The output shaft 15 of the automated manual transmission 12 is connected to the drive shaft 20 via the differential 18 so that a driving force of the output shaft 15 is transmittable to the drive shaft 20 (see FIG. 1). Accordingly, the engine torque Te is controlled to increase or decrease by gears (the gear sets 33) of the automated manual transmission 12 and is transmitted to the drive shaft 20 via the differential 18 to thereby drive the vehicle 2.

The motor 8, which is connected to the differential 18, is a three-phase alternating current synchronous motor, for example, used in a general hybrid vehicle. A rotor shaft of the motor 8 is rotatably connected to an input side of the differential 18 via a deceleration mechanism. That Is, the rotor shaft of the motor 8 is rotatably connected to both the output shaft 15 of the automated manual transmission 12 and the driving wheels 22. The inverter 28 and the battery 6 are connected to the motor B. The inverter 28 includes an AC terminal and a DC terminal serving as input and output terminals. The AC terminal is connected to a power supply terminal of the motor 8 while the DC terminal is connected to a terminal of the battery 6. The inverter 28 includes a direct current to alternating current conversion function for converting the direct current output from the battery 6 into the alternating current with variable frequencies so as to supply the alternating current to the motor 8, and an alternating current to direct current conversion function for converting AC power generated at the motor 8 into DC power so that the battery 6 is charged. The MG ECU 26 controls the inverter 28 to thereby drive the motor 8 and perform a torque assist relative to the drive shaft 20. In addition, in a case where the motor 8 is used as the generator, the battery 6 is charged with a regenerated energy generated by the motor 8. The SOC value detection sensor 48 is provided at the battery 6 so that the battery ECU 40 controls the charging condition of the battery 6 based on an SOC value (a state of charge value) detected by the SOC value detection sensor 48.

Figure 2:
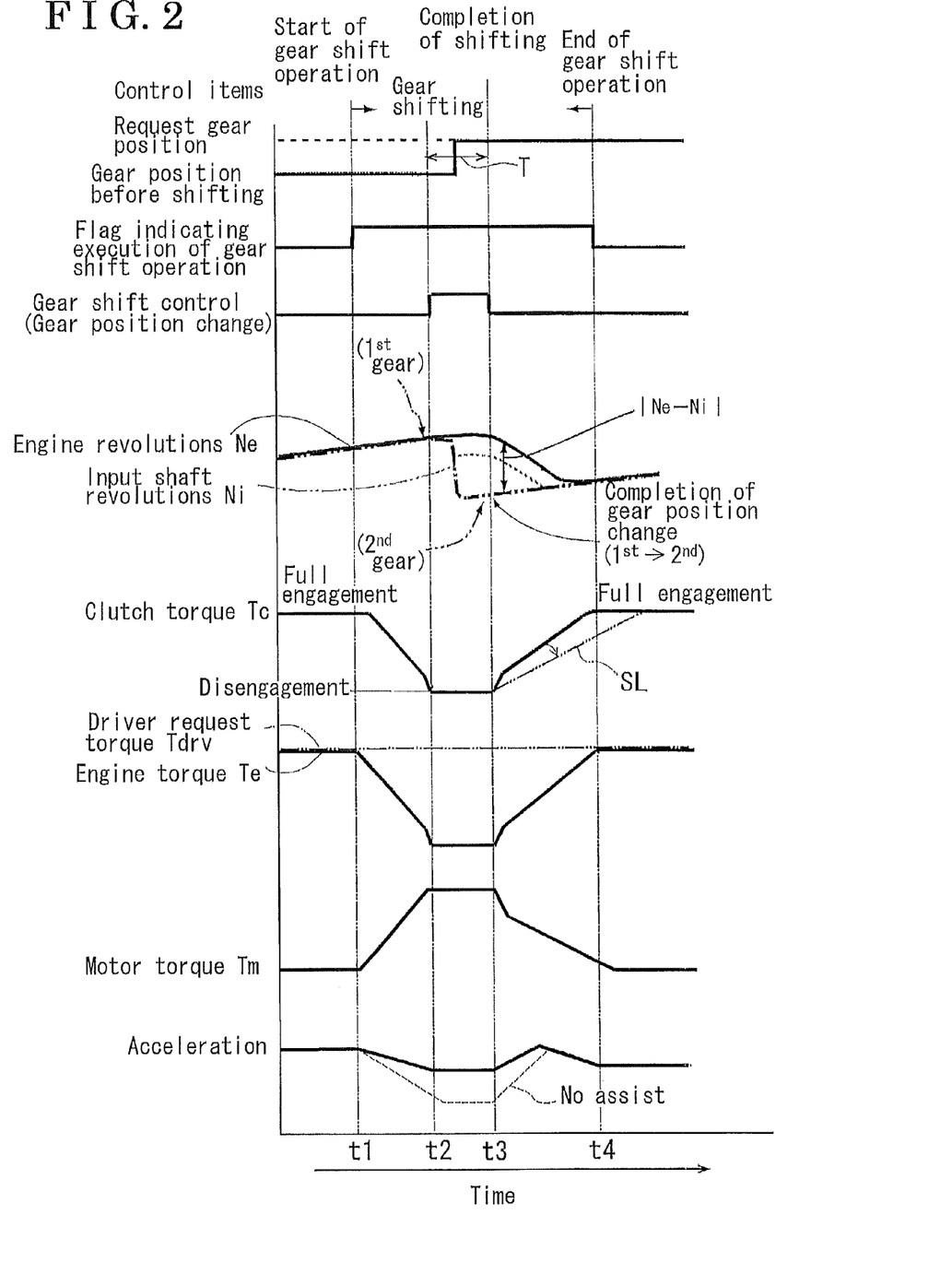
FIG. 2 is a time chart of a gear shift operation according to the embodiment.

The gear shift operation of the automated manual transmission 12 is generally performed according to a time chart illustrated in FIG. 2. FIG. 2 illustrates the time chart of the gear shift operation from the $1^{st}$ gear to the $2^{nd}$ gear, for example. A horizontal axis in FIG. 2 indicates time while a vertical axis indicates, from the upper side in FIG. 2, gear positions, a flag indicating an execution of the gear shift operation, a gear position change, engine revolutions (input shaft revolutions), the clutch torque Tc, the engine torque Te (the driver request torque Tdrv), a motor torque Tm, and the acceleration of the vehicle 2.

The gear shift operation is started from time t1 and is completed at time t4. The time chart in FIG. 2 indicates a case where the driver of the vehicle 2 intends to accelerate the vehicle 2 and depresses the accelerator pedal 55 at a constant level during the gear shift operation.

Figure 8:
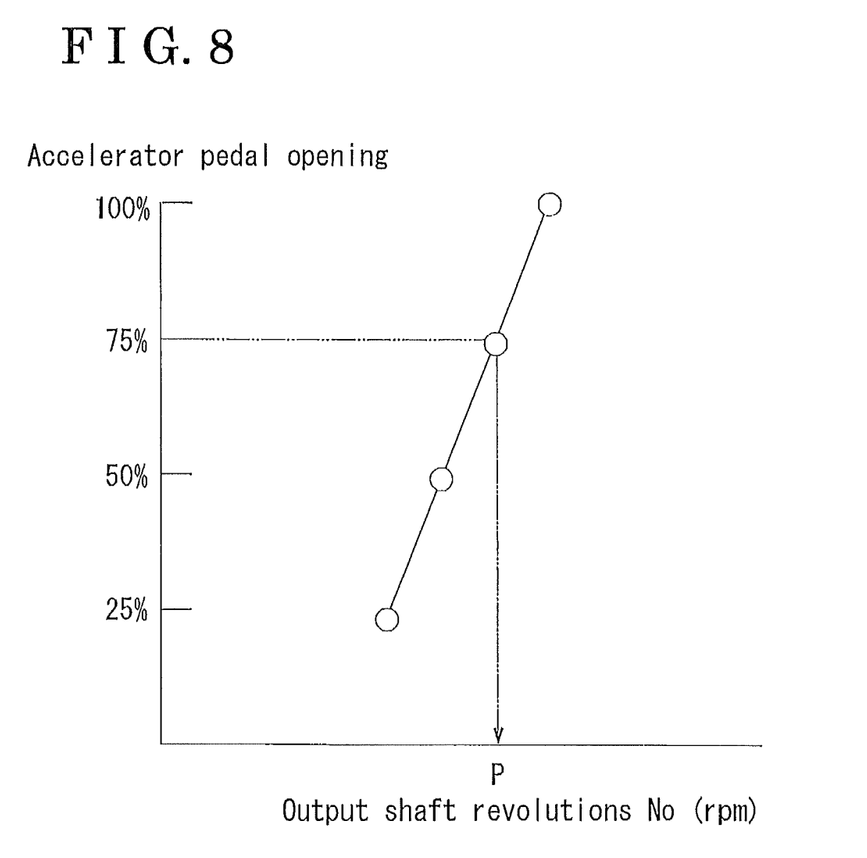
FIG. 8 is a graph illustrating a gear shift line when a gear position is changed.

The AMT ECU 38 includes a gear shift line specified for each gear position as illustrated in FIG. 8. In a case where output shaft revolutions No of the automated manual transmission 12 reach the revolutions indicated by the gear shift line, a flag indicating an execution of the gear shift operation is turned on at the HV ECU 24 by a command from the AMT ECU 38 to thereby start the control of the gear shift operation. The automated manual transmission 12 causes the clutch actuator 32 to operate at time t1 by the command from the AMT ECU 38. The clutch actuator 32 disengages between the flywheel and the clutch disc of the clutch device 16 by time 2. The clutch device 16 is in a fully disengagement state during a time period from time t2 to time t3

At time t2, the AMT ECU 38 appropriately drives the shift actuator 34 and the select actuator 36 so as to change the gear position of the automated manual transmission 12. At time t3, the ENG ECU 30 drives the throttle actuator 54 and operates the throttle valve 50 so that the engine revolutions Ne are compatible with input shaft revolutions Ni of the automated manual transmission 12 based on the gear position after changing and the vehicle speed at that time. At this time, the clutch device 16 generates a partial engagement state while gradually increasing the clutch torque Tc by driving the clutch actuator 32 so that the engine revolutions Ne are appropriately compatible with the input shaft revolutions Ni at the gear position after changing. The clutch device 16 is eventually brought into a fully engagement state to thereby finish the gear shift operation at time t4.

At time t1 at which the gear shift operation is started and the disengagement of the clutch device 16 is started (i.e., when a gear shift condition is satisfied), the MG ECU 26 drives the motor 8 so as to start generating the assist torque. Based on the request from the AMT ECU 38, the engine torque Te decreases while the MG ECU 26 generates the assist torque corresponding to the decrease of the engine torque Te. The assist torque generated in the aforementioned manner corresponds to a difference obtained by subtracting the driving torque by the engine 4 from the driver request torque Tdrv within a range not exceeding the driver request torque Tdrv, Afterwards, in response to the increase of the driving torque by the engine 4 (from time t3 to time t4), the generation of the assist torque gradually decreases and stops. The assist torque generated by the motor 8 from time t1 to time t4 is transmitted to the driving wheels 22 via the differential 18. Accordingly, the control of the gear shift operation by the HV ECU 24, the MG ECU 26, and the AMT ECU 38 is completed.

In the control of the gear shift operation, a correspondence relationship between the control amount of the clutch actuator 32 by the clutch device 16 and the clutch torque Tc is necessary. Such correspondence relationship is obtained by a map stored at the ROM for indicating a correspondence relationship between the actuator operation amount (the control amount of the clutch actuator 32) Sa and the clutch torque Tc.

Figure 4:
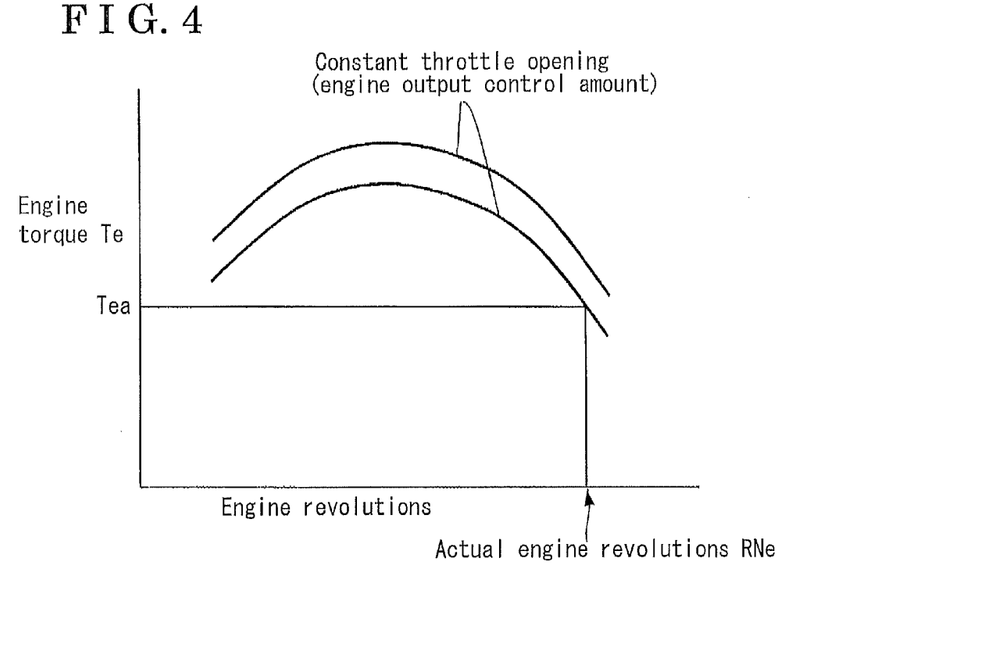
FIG. 4 is a graph illustrating a relationship between an engine torque and an engine revolutions when an engine output control amount is constant according to the embodiment.
Figure 7:
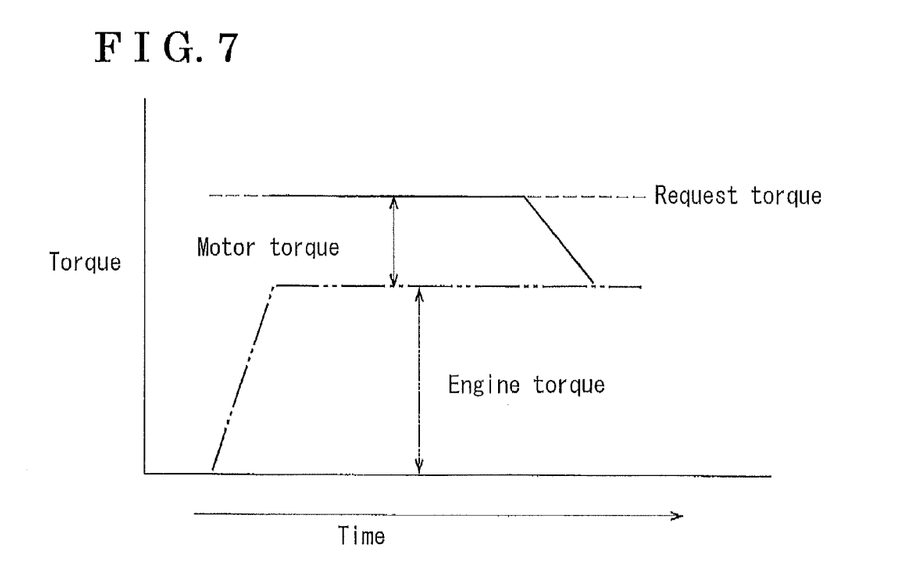
FIG. 7 is a graph illustrating a motor torque when the driving assist is performed.

A driving assist by the motor 8 is achieved by the assist torque (the motor torque) serving as a difference between the request torque by the driver and the estimated engine torque Te as illustrated in FIG. 7 while the estimated engine torque Te is obtained by a map illustrating a relationship between the throttle opening and the engine revolutions as illustrated in FIG. 4, The assist torque is transmitted to the driving wheels 22 via the differential 18.

Figure 5:
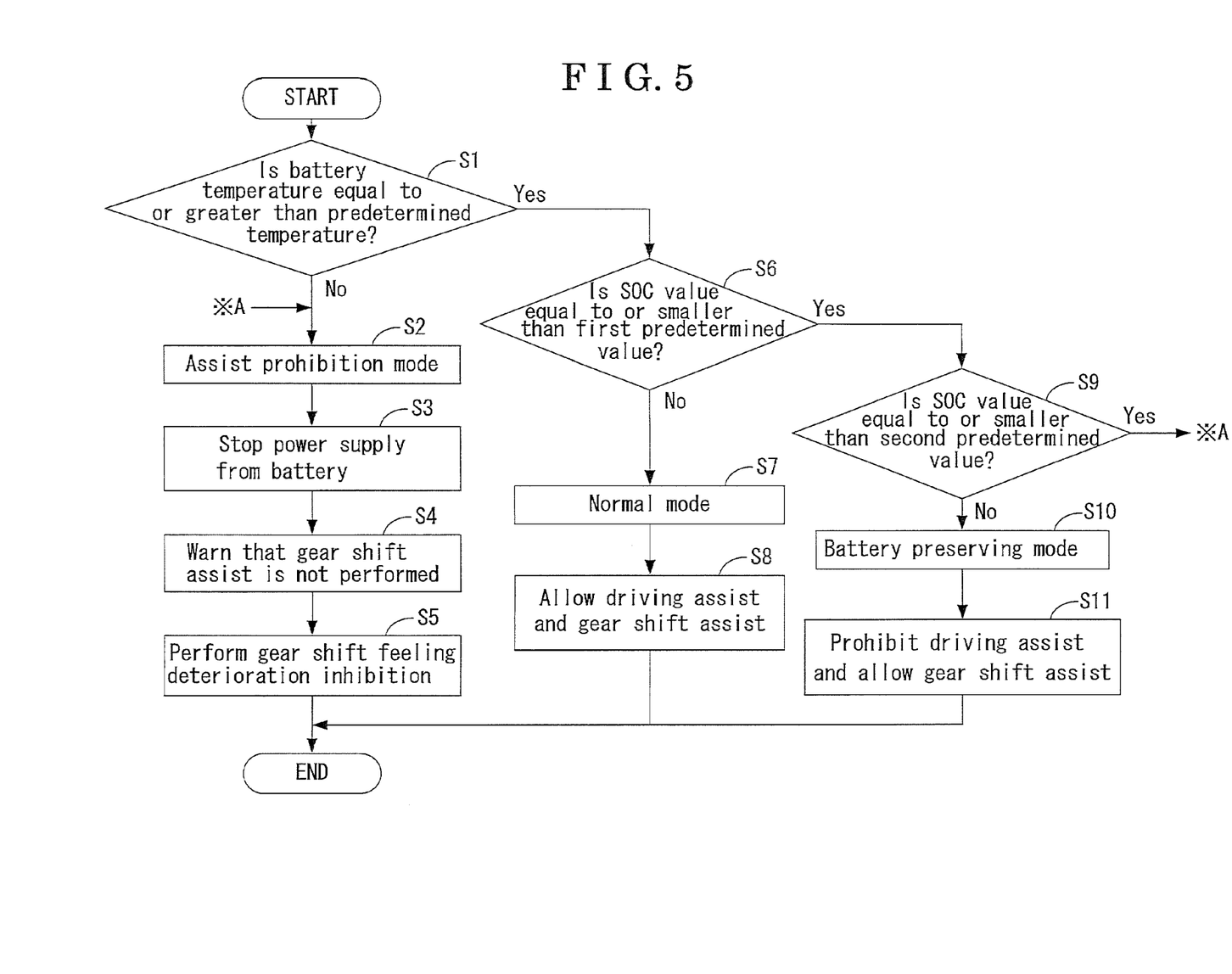
FIG. 5 is a flowchart performed by the control apparatus according to the embodiment.
Figure 6:
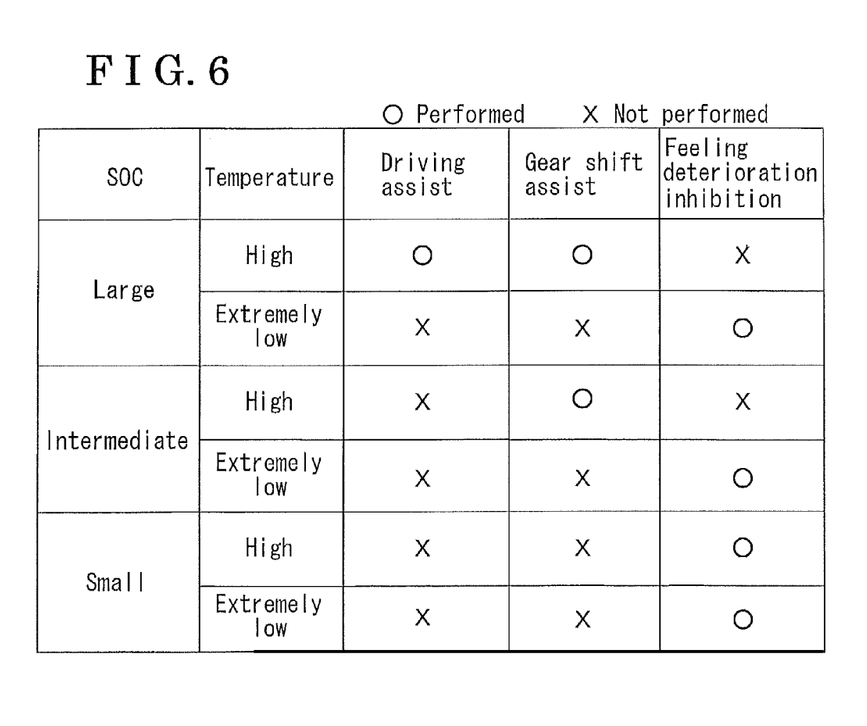
FIG. 6 is a table illustrating an execution of a driving assist, a gear shift assist, and a gear shift feeling deterioration inhibition depending on a battery condition.

Next, an assist control in consideration of the battery condition of the vehicle 2 having the aforementioned configuration will be explained with reference to FIGS. 5 and 6. As illustrated in a flowchart of FIG. 5, the HV ECU 24 determines whether or not the temperature of the battery 6 is equal to or greater than a predetermined temperature based on a detection signal of the battery temperature sensor 46 in step 1 (I.e., S1, hereinafter "step" will be abbreviated to "S"). The predetermined temperature is specified in view of types, capacity, and characteristics of the battery. For example, the predetermined temperature is specified to be −15 degrees that is stored at the ROM in the HV ECU 24 beforehand.

In a case where the temperature of the battery 6 is smaller than the predetermined temperature, a chemical reaction at an inside of the battery 6 is weak and an efficiency in discharge and charge is reduced, which leads to an insufficient electric power supply even when the SOC value is in the high charging state. Therefore, the temperature of the battery 6 is first detected.

In a case where the temperature of the battery 6 is smaller than the predetermined temperature, the HV ECU 24 changes an operation mode of the vehicle 2 to an assist prohibition mode in 52 and transmits a command to the MG ECU 26 so as to stop the power supply to the motor 8. The driving assist and a gear shift assist by the motor 8 relative to the engine torque are prohibited in 83. That is, the power supply from the battery 6 is stopped. As illustrated in FIG. 6, in a case where the temperature of the battery 6 is extremely low, the driving assist and the gear shift assist are prohibited as indicated by cross marks (X). S2 in FIG. 5 servos as a third mode switch device for switching the operation mode to the assist prohibition mode by the HV ECU 24.

Next, a warning display (a warning device) is conducted to draw the driver's attention by indicating that the gear shift assist is not performed in S4. A blinking display of a specific mark lamp, for example, is used as the warning display. The warning display may inhibit the driver of the vehicle 2 from feeling discomfort and further having an anxiety feeling in a case where the assist relative to a fluctuation in the engine torque is not performed at a time of the gear shift operation.

A gear shift feeling deterioration inhibition is performed in S5. That is, the operation mode of the vehicle 2 is changed to a gear shift feeling deterioration inhibition mode in S5. As illustrated in FIG. 6, in a case where the temperature of the battery 6 is extremely low, the gear shift feeling deterioration inhibition is performed as indicated by a round mark. According to a first example of the feeling deterioration inhibition, time T (a shifting time period) after which the gear position Is changed to the next position is shortened. Accordingly, a time period during which a torque drop occurs, the torque drop causing the driver to feel like the clutch device 16 is brought into the disengagement state, may be reduced. S5 serves as a gear shift feeling deterioration inhibition device.

In addition, according to a second example of the feeling deterioration inhibition, a recovery from a torque down state in a case where the clutch device 16 In the disengagement state is brought into the engagement state may be smoothened. For example, according to a command from the AMT ECU 38, a line SL (see FIG. 2) indicated by the clutch torque Tc in a state where the clutch device 16 is changed from the disengagement state to the engagement state is gently inclined. As a result, an acceleration change is made gentle so as to ease a shift shock in a state where the clutch device 16 is brought into the engagement state from the disengagement state.

Further, according to a third example of the feeling deterioration inhibition, a shift point at which the gear position is changed (i.e., the gear shift line specified for each gear position) is raised. Accordingly, the shift timing is slow to thereby increase the engine revolutions at the time of the gear shift operation. At this time, as illustrated in FIG. 4, the engine torque decreases in association with the increase of the engine revolutions after the engine revolutions increase by a predetermined amount or more in a state where the throttle opening is constant (which is indicated by an engine torque Tea and an actual engine revolutions RNe in FIG. 4). As a result, the decrease of the engine torque at the time of the gear shift operation inhibits the increase of the torque transmitted to the driving wheels 22 (i.e., the acceleration) to thereby decrease the torque fluctuation.

At least one of the aforementioned examples of the gear shift feeling deterioration inhibition is performed so that the automated manual transmission 12 for the vehicle 2 which causes a large difference in the gear shift feeling between cases where the assist by the motor 8 is obtained and where the assist by the motor 8 is not obtained may Inhibit the driver (passenger) from having uncomfortable feeling. As a result, a comfortable usage of the vehicle 2 is obtained.

In a case where it is determined that the temperature of the battery 6 is equal to or greater than the predetermined temperature, the HV ECU 24 then determines whether or not the SOC value of the battery 6 is equal to or smaller than a first predetermined value by a detection signal of the SOC value detection sensor 48 in S6. The first predetermined value is specified in view of types, capacity, and characteristics of the battery, For example, the first predetermined value is specified to be 50% and stored beforehand at the ROM of the HV ECU 24.

In a case where it is determined that the SOC value is greater than the first predetermined value in S6, the HV ECU 24 informs the MG ECU 26 that the operation mode of the vehicle 2 is a normal mode in S7. The MG ECU 26 allows the power supply to the motor 8 for a driving assist control performed depending on the driving state of the vehicle 2 and a gear shift assist control performed at the gear shift operation by controlling the inverter 28 in S8.

In a case where it is determined that the SOC value is equal to or smaller than the first predetermined value in S6, the HV ECU 24 then determines whether or not the SOC value is equal to or smaller than a second predetermined value that is smaller than the first predetermined value in S9. The second predetermined value is specified in view of types, capacity, and characteristics of the battery. For example, the second predetermined value is specified to be 40% and stored beforehand at the ROM of the HV ECU 24.

In a case where it is determined that the SOC value is greater than the second predetermined value in S9, the HV ECU 24 changes the operation mode of the vehicle 2 to a battery preserving mode in S10. The HV ECU 24 transmits a command to the MG ECU 26 to stop the power supply to the motor 8 for the driving assist and to allow the power supply to the motor 8 for the gear shift assist. The MG ECU 26 prohibits the driving assist control by the motor 8 relative to the engine torque and allows the gear shift assist control by the motor 8 performed at the time of the gear shift operation in S11. The aforementioned state is illustrated in FIG. 6 by the battery temperature showing "high" and the SOC value showing "intermediate". At this time, the driving assist is prohibited as indicated by the cross mark while the gear shift assist is allowed as indicated by the circle mark. S10 serves as a first mode switch device for switching the operation mode to the battery preserving mode by the HV ECU 24.

In S9, when it is determined that the SOC value is equal to or smaller than the second predetermined value, the HV ECU 24 changes the operation mode to the assist prohibition mode in S2 serving as a second mode switch device. The same control as the control when the battery temperature is smaller than the predetermined temperature is performed to thereby stop the assist control in view of the battery condition of the vehicle 2. S2 constitutes the second mode switch device switching the operation mode to the assist prohibition mode by the HV ECU 24 when the SOC value is equal to or smaller than the second predetermined value. The aforementioned state is illustrated in FIG. 6 by the battery temperature showing "high" and the SOC value showing "small". At this time, the driving assist and the gear shift assist are both prohibited as Indicated by the cross marks while the gear shift feeling deterioration inhibition is permitted.

According to the control device of the hybrid vehicle having the aforementioned configuration, the operation mode of the vehicle 2 is switched to the battery preserving mode in a case where the SOC value of the battery 6 supplying the electric power to the motor 8 is equal to or smaller than the first predetermined value to thereby stop the driving assist that has been performed in the normal mode. Then, the electric power for the driving assist is preserved to thereby reduce the power consumption of the battery 6. The gear shift assist at the time of the gear shift operation of the vehicle 2 is continuously performed so as to inhibit the deterioration of the gear shift feeling caused by the torque fluctuation at the time of the gear shift operation of the vehicle 2.

In addition, according to the control device of the hybrid vehicle of the embodiment, the assist control is totally prohibited relative to the output shaft 10 of the engine 4 by the assist prohibition mode in a case where the SOC value of the battery 6 is equal to or smaller than the second predetermined value that is smaller than the first predetermined value. Thus, the power supply from the battery 6 for the assist control is stopped. The power consumption of the battery 6 is sopped to thereby inhibit an excess discharge of the battery 6 thereafter.

Further, according to the control device of the hybrid vehicle, a passenger of the hybrid vehicle 2 is informed that the operation mode is changed to the assist prohibition mode by the warning display (the warning device) to thereby inhibit the passenger from feeling frightened or anxiety because of the change of the gear shift feeling.

Furthermore, according to the control device of the hybrid vehicle of the embodiment, the gear shift operation by the automated manual transmission 12 is brought into the gear shift feeling deterioration inhibition mode to thereby decrease the torque drop because of the impossibility of the gear shift assist by the motor 8 and the deterioration of the passenger's feeling because of the gear shift shock, Even in a case where the SOC value is high, (i.e., equal to or greater than the first predetermined value) and the charging condition of the battery 6 is good, the chemical reaction for generating the electric power is weak when the temperature of the battery 6 is extremely low, which leads to a decrease of the power supply from the battery 6. According to the control device of the hybrid vehicle of the embodiment, when the temperature of the battery 6 is extremely low, the assist control is totally prohibited relative to the output shaft 10 of the engine 4 by the assist prohibition mode to thereby stop the power supply from the battery 6.

According to the aforementioned embodiment, the motor 8 is rotatably connected to the output shaft 15 of the automated manual transmission 12 via the differential 18. Alternatively, for example, the motor 8 may be rotatably connected to the input shaft 14 of the automated manual transmission 12.

In addition, according to the aforementioned embodiment, the control device of the hybrid vehicle is applied to a so-called parallel hybrid vehicle. Alternatively, the control device of the hybrid vehicle according to the present embodiment may be applied to a series-parallel hybrid vehicle.

The control device of the hybrid vehicle of the embodiment is not limited to include the aforementioned configuration and may be appropriately modified or changed.

According to the aforementioned embodiment, the control apparatus further includes the second mode switch device (i.e., S2) switching the operation mode from the battery power preserving mode to the assist prohibition mode in which the driving assist control and the gear shift assist control are prohibited in a case where the SOC value is equal to or smaller than the second predetermined value that is smaller than the first predetermined value.

According to the aforementioned embodiment, the control apparatus further includes the warning device informing the passenger in the hybrid vehicle 2 that the operation mode is switched to the assist prohibition mode.

According to the aforementioned embodiment, the control apparatus further includes the gear shift feeling deterioration inhibition device (i.e., S5) easing the torque fluctuation that occurs in association with the torque drop during the gear shift operation in a case where the gear shift assist control Is prohibited.

According to the aforementioned embodiment, the control apparatus further includes the battery temperature sensor 46 detecting the temperature of the battery 6 and the third mode switch device (i.e., S2) switching the operation mode to the assist prohibition mode in which the driving assist control and the gear shift assist control are prohibited in a case where the temperature of the battery 6 detected by the battery temperature sensor 46 is smaller than the predetermined temperature.

According to the aforementioned embodiment, the operation mode is switched to the battery power preserving mode in which the MG ECU 26 (the driving assist control device) prohibits the driving assist control and permits the gear shift assist control in a case where the SOC value is greater than the second predetermined value.

According to the aforementioned embodiment, the first predetermined value is 50% and the second predetermined value is 40%.

According to the aforementioned embodiment, the HV ECU 24 (the gear shift feeling deterioration inhibition device) reduces the shifting time period after which the gear position of the automated manual transmission 12 is changed to the next gear position.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A control apparatus of a hybrid vehicle, comprising:
an automatic transmission including an input shaft driven to rotate by an engine torque of an engine mounted at a hybrid vehicle, an output shaft rotatably connected to driving wheels, and a plurality of gear sets configured to connect the input shaft and the output shaft to be rotatable at different gear ratios, the automatic transmission including a changing device that selects one of the plurality of gear sets to cause the selected one of the plurality of gear sets to be rotatably connected to the input shaft and the output shaft;
a gear shift operation control device controlling a gear shift operation of the automatic transmission;
a clutch being switchable by a clutch driving device between an engagement state where an output shaft of the engine and the input shaft of the automatic transmission are rotatably connected to each other and a disengagement state where the connection between the output shaft of the engine and the input shaft of the automatic transmission is released;
a motor rotatably connected to the driving wheels;
a battery connected to the motor;
a driving assist control device performing a driving assist control by driving the motor as necessary in a driving state of the hybrid vehicle to generate an assist torque;
a gear shift assist control device performing a gear shift assist control by driving the motor to generate the assist torque in response to a decrease of the engine torque transmitted to the driving wheels caused by the disengagement state of the clutch in a state where a gear shift condition is satisfied;
an SOC value detection device detecting an SOC value of the battery; and
a first mode switch device switching an operation mode of the hybrid vehicle from a normal mode in which the driving assist control and the gear shift assist control are performed to a battery power preserving mode in which the driving assist control is prohibited and the gear shift assist control is permitted in a case where the SOC value detected by the SOC value detection device is equal to or smaller than a first predetermined value.

2. The control apparatus according to claim 1, further comprising a second mode switch device switching the operation mode from the battery power preserving mode to an assist prohibition mode in which the driving assist control and the gear shift assist control are prohibited in a case where the SOC value is equal to or smaller than a second predetermined value that is smaller than the first predetermined value.

3. The control apparatus according to claim 2, further comprising a warning device informing a passenger in the hybrid vehicle that the operation mode is switched to the assist prohibition mode.

4. The control apparatus according to claim 2, further comprising a gear shift feeling deterioration inhibition device easing a torque fluctuation that occurs in association with a torque drop during the gear shift operation in a case where the gear shift assist control is prohibited.

5. The control apparatus according to claim 1, further comprising a battery temperature detection device detecting a temperature of the battery and a third mode switch device switching the operation mode to an assist prohibition mode in which the driving assist control and the gear shift assist control are prohibited in a case where the temperature of the battery detected by the battery temperature detection device is smaller than a predetermined temperature.

6. The control apparatus according to claim 2, wherein the operation mode is switched to the battery power preserving mode in which the driving assist control device prohibits the driving assist control and permits the gear shift assist control in a case where the SOC value is greater than the second predetermined value.

7. The control apparatus according to claim 2, wherein the first predetermined value is 50% and the second predetermined value is 40%.

8. The control apparatus according to claim 4, wherein the gear shift feeling deterioration inhibition device reduces a shifting time period after which a gear position of the automatic transmission is changed to a next gear position.

9. A control apparatus of a hybrid vehicle, comprising:
an automatic transmission including an input shaft driven to be rotated by an engine torque of an engine mounted on a hybrid vehicle, an output shaft rotatably connected to driving wheels, and a plurality of gear sets configured to connect the input shaft and the output shaft to be rotatable at different gear ratios, the automatic transmission including a changing device that selects one of the plurality of gear sets to cause the selected one of the plurality of gear sets to be rotatably connected to the input shaft and the output shaft;
a gear shift operation control device controlling a gear shift operation of the automatic transmission;
a clutch being switchable by a clutch driving device between an engagement state where an output shaft of the engine and the input shaft of the automatic transmission are rotatably connected to each other and a disengagement state where the connection between the output shaft of the engine and the input shaft of the automatic transmission is released;
a motor rotatably connected to the driving wheels;
a battery connected to the motor;

a driving assist control device performing a driving assist control by driving the motor as necessary in a driving state of the hybrid vehicle to generate an assist torque;

a gear shift assist control device performing a gear shift assist control by driving the motor to generate the assist torque in response to a decrease of the engine torque transmitted to the driving wheels caused by the disengagement state of the clutch in a state where a gear shift condition is satisfied;

an SOC value detection device detecting an SOC value of the battery;

a battery temperature detection device detecting a temperature of the battery;

a gear shift feeling deterioration inhibition device performing gear shift feeling deterioration inhibition for easing a torque fluctuation that occurs in association with a torque drop during the gear shift operation in a case where the gear shift assist control is prohibited; and a control unit that allows or prohibits each of the driving assist control, the gear shift assist control, and the gear shift feeling deterioration inhibition, based on the SOC value and the temperature of the battery.

10. The control apparatus according to claim 9, wherein when the temperature of the battery is equal to or greater than a predetermined temperature and the SOC value is equal to or smaller than a first predetermined value, the control unit prohibits the driving assist control, and allows the gear shift assist control to be performed in the state where the gear shift condition is satisfied.

11. The control apparatus according to claim 10, wherein when the temperature of the battery is equal to or smaller than a second predetermined value that is smaller than the first predetermined value, the control unit further prohibits the gear shift assist control.

12. The control apparatus according to claim 9, wherein when the temperature of the batter is smaller than a predetermined temperature, the control unit prohibits the driving assist control and the gear shift assist control, and allows the gear shift feeling deterioration inhibition to be performed during the gear shift operation.

* * * * *